No. 756,140. PATENTED MAR. 29, 1904.
W. E. REID & W. H. LAU.
HOSE LINING.
APPLICATION FILED JULY 15, 1903.
NO MODEL.
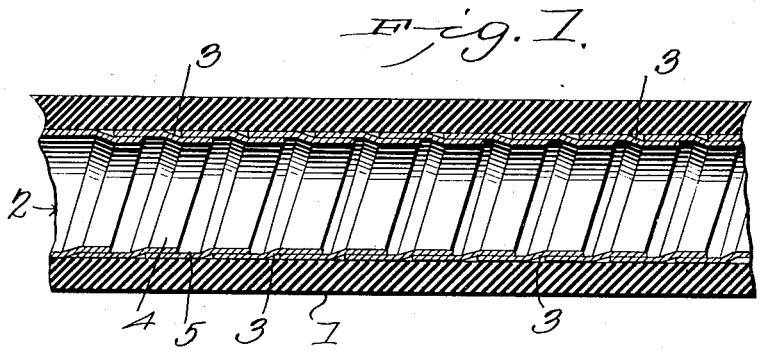
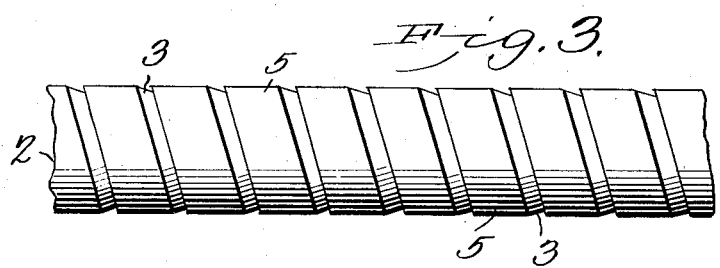
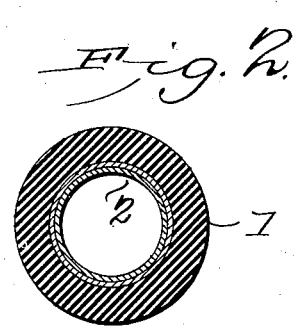
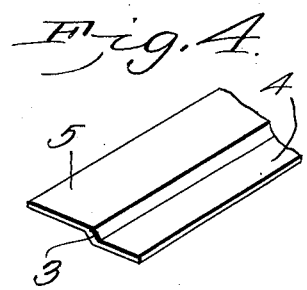
Witnesses
W. E. Reid
W. H. Lau
Inventors
by C. A. Snow & Co
Attorneys No. 756,140. Patented March 29, 1904.

UNITED STATES PATENT OFFICE.

WILLIAM E. REID AND WILLIAM H. LAU, OF DETROIT, MICHIGAN.

HOSE-LINING.

SPECIFICATION forming part of Letters Patent No. 756,140, dated March 29, 1904.

Application filed July 15, 1903. Serial No. 165,656. (No model.)

*To all whom it may concern:*

Be it known that we, WILLIAM E. REID and WILLIAM H. LAU, citizens of the United States, residing at Detroit, in the county of Wayne and State of Michigan, have invented a new and useful Hose-Lining, of which the following is a specification.

This invention relates to an improved metallic lining for hose, pipes, tubing, and the like, and has for its object to provide a simple, inexpensive, and efficient lining of this character possessing the requisite degree of flexibility to permit the hose to be easily coiled and used under ordinary conditions.

A further object of the invention is to provide a lining formed of a helically-wound strip, the helices being offset and overlapping each other, forming, in effect, a continuous tube and rendering the hose capable of withstanding great internal and external pressure.

A still further object is to produce a flexible lining which may be quickly placed in position and when inserted in the hose will expand, impinging on the walls thereof, and prevent accidental displacement of the lining.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the accompanping drawings, Figure 1 is a longitudinal sectional view of a portion of a hose provided with our improved lining. Fig. 2 is a transverse section of the same. Fig. 3 is a side elevation of the lining detached, and Fig. 4 is a persrective view of a portion of the strip or blank from which the lining is formed.

Similar numerals of reference indicate corresponding parts in all the figures of the drawings.

1 designates a section of a hose of the ordinary form and construction.

The tube or lining 2 consists of a helically-wound strip of metal or other suitable material—preferably flexible galvanized steel on account of its non-corrodible qualities—each helix comprising the tube or lining being formed with an offset or shoulder 3, defining a reduced portion 4, adapted to receive the overlapping enlarged portion 5 of the adjacent and preceding helix, forming, in effect, a continuous tube, as clearly shown in Fig. 1 of the drawings.

In manufacturing the tube or lining we take a strip of metal having straight parallel sides and of a width in proportion to the number of convolutions or helices desired to a given length of tubing and pass said strip through a heading or flanging machine to form the offset or shoulder 3, after which one end of the strip is fastened to a spindle or mandrel and placed in a jig, the strip being wound on said mandrel so as to cause the enlarged portion of one helix to overlap the reduced portion of preceding one. The mandrel containing the strip of metal thus wound is introduced in the hose and the mandrel withdrawn, the tube upon being released expanding and impinging the inner walls of the hose, holding the lining in position and preventing the same from being accidentally withdrawn.

A lining constructed as above described will not only materially strengthen the hose and render it capable of withstanding enormous internal and external pressure, but by reason of the peculiar form of overlapping joint will permit the lining to give in all directions with the movement of the hose without exposing the interior walls of the hose to the action of steam, water, or other fluids contained therein. The lining being formed of spring metal upon being introduced in the hose will engage the walls thereof by frictional contact, effectively securing the same in position without the use of auxiliary or extraneous fastening devices.

Having thus described the invention, what we claim, and desire to secure by Letters Patent, is—

1. A hose-lining formed of a single strip of resilient material wound to form a series of overlapping helices, each helix being provided with an offset portion to thereby present a practically smooth and continuous surface for contact with the inner wall of the hose.

2. A hose-lining formed of a single strip of resilient material having an offset portion and wound to form a series of continuous overlapping helices to thereby present an expansible and flexible tube for contact with the inner wall of the hose.

3. A hose-lining formed of a single strip of metal wound to form a series of expansible helices each having an enlarged and reduced portion, the enlarged portion of one helix overlapping the reduced portion of the other to thereby present a practically smooth and continuous surface for contact with the inner wall of the hose.

In testimony that we claim the foregoing as our own we have hereto affixed our signatures in the presence of two witnesses.

WILLIAM E. REID.
WILLIAM H. LAU.

Witnesses:
ADAM BETZING, Jr.,
GEO. E. FITZSIMMONS.